United States Patent
Demain et al.

[15] 3,635,795

[45] Jan. 18, 1972

[54] ENZYMATIC RESOLUTION OF RACEMIC (CIS-1,2-EPOXYPROPYL) PHOSPHONIC ACID COMPOUNDS

[72] Inventors: Arnold L. Demain, Westfield; John M. Chemerda, Watchung, Plainfield; Raymond F. White, Englishtown, all of N.J.

[73] Assignee: Merck & Co., Inc., Rahway, N.J.

[22] Filed: Dec. 27, 1968

[21] Appl. No.: 787,580

[52] U.S. Cl. .................................... 195/2, 195/29, 195/30
[51] Int. Cl. .......................................................... C12d 9/00
[58] Field of Search ............................ 195/2, 29, 30, 80, 114

[56] References Cited

FOREIGN PATENTS OR APPLICATIONS

| | | | |
|---|---|---|---|
| 1,046,047 | 12/1958 | Germany | 424/203 |
| 1,087,066 | 10/1967 | Great Britain | 424/203 |

OTHER PUBLICATIONS

Churi et al., J. of Am. Chem. Soc., 83, 1966, pp. 1824– 1825
Chemical Abstracts, 62 (1965), 10457(f)
Derwent Farmdoc No. 35,893, Abstracting BE718,507, Publ. 1–24–69

*Primary Examiner*—Joseph M. Golian
*Attorney*—John Frederick Gerkens, J. Jerome Behan and I. Louis Wolk

[57] ABSTRACT

Enantiomeric mixtures of esters and amides of (cis-1,2-epoxypropyl)phosphonic acid (−) stereoselectively hydrolyzed by enzymes of micro-organisms to produce (−) (cis-1,2-epoxypropyl)phosphonic acid. This product and its salts have antibacterial activity.

12 Claims, No Drawings

ENZYMATIC RESOLUTION OF RACEMIC (CIS-1,2-EPOXYPROPYL) PHOSPHONIC ACID COMPOUNDS

This invention is concerned with a method of separating (−) (cis-1,2-epoxypropyl)phosphonic acid from enantiomeric mixtures of derivatives of (cis-1,2-epoxypropyl)phosphonic acid. More particularly, it relates to a method of stereoselectively hydrolyzing esters and amides of (−) (cis-1,2-epoxypropyl)phosphonic acid.

BACKGROUND OF THE INVENTION (−) (cis-1,2-epoxypropyl)phosphonic acid and its salts are valuable antibiotics which are effective against various gram-positive and gram-negative pathogens. Although these antibiotics can be produced by fermentation of suitable strains of Streptomyces, for example by growing *Streptomyces fradiae* NRRL B-3351 aerobically in suitable fermentation mediums, other methods have been found whereby the antibiotic, its salts, esters, and amides, can be prepared by synthesis, for example, from cis-propenylphosphonic acid and derivatives thereof. One disadvantage of such synthetic methods is that the desired product is obtained mixed with its enantiomer, usually in the form of a racemate, and it must be separated in order to obtain the product in pure form.

SUMMARY OF THE INVENTION

It is an object of the present invention to provide a method whereby the (−) isomer of (cis-1,2-epoxypropyl)phosphonic acid can be obtained from mixtures of esters and amides of (+) and (−) (cis-1,2-epoxypropyl)phosphonic acid. Another object is to provide a process for stereoselectively hydrolyzing esters and amides of (cis-1,2-epoxypropyl)phosphonic acid stereoisomers to obtain (−) (cis-1,2-epoxypropyl)phosphonic acid and salts thereof. Other objects will be apparent from the detailed description of this invention hereinafter provided.

In accordance with the present invention, it is found that ester and amide antipodes of (cis-1,2-epoxypropyl)phosphonic acid can be selectively hydrolyzed by subjecting such mixtures to the action of enzymes of selective hydrolyzing strains of micro-organisms to produce mixtures containing (−) (cis-1,2-epoxypropyl)phosphonic acid or salts thereof. In carrying out the process of this invention, the esters or amides can be added to a nutrient medium in which the micro-organism is grown, or intimately contacted with cells of the organism in suitable buffered mediums.

Thus, in accordance with preferred embodiments of this invention, when antipode mixtures of esters and amides of the formula

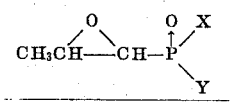

wherein X represents OR or NR$_1$R$_2$ and Y represents NR$_1$R$_2$ or OH where R is a straight- or branched-chain lower alkyl, lower alkenyl, or lower alkynyl group and R$_1$ and R$_2$ represent the same or different hydrocarbyl groups, substituted hydrocarbyl groups or hydrogen, and are subjected to the action of enzymes of certain micro-organisms the esters and amides of (−) (cis-1,2-epoxypropyl)phosphonic acid are selectively hydrolyzed to produce the (−) phosphonic acid without concomitantly hydrolyzing the (+) (cis-1,2-epoxypropyl)phosphonic acid derivatives. The (−) (cis-1,2-epoxypropyl)phosphonic acid or a salt thereof can then be separated from the esters or amides of the (+) enantiomer.

Pursuant to one preferred embodiment of this invention, monoester enantiomeric mixtures of compounds of the formula

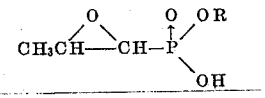

and salts thereof wherein R is a straight- or branched-chain alkyl group of one to seven carbon atoms, an alkenyl group of two to seven carbon atoms, or an alkyl group of two or seven carbon atoms are especially useful starting materials since the (−) enantiomer can be cleaved substantially quantitatively without concomitant hydrolysis of the (+) enantiomer, thereby resulting in a mixture of (−) (cis-1,2-epoxypropyl)phosphonic acid and the (+) monoester which can be readily separated to obtain the desired (−) acid or a salt thereof.

Similarly, enantiomeric mixtures of amides of the general formula

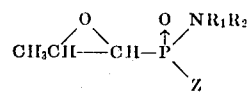

wherein R$_1$ and R$_2$ are the same as defined above and Z represents NR$_1$R$_2$ or OH, or salts thereof can be selectively hydrolyzed to obtain (−) (cis-1,2-epoxypropyl)phosphonic acid while the (+) amides remain substantially unchanged. Thus, the (−) (cis-1,2-epoxypropyl)phosphonic acid in the resulting reaction mixture can be separated from the amide of (+) (cis-1,2-epoxypropyl)phosphonic aicd.

In the foregoing structural formula of the amide, the substituents R$_1$ and R$_2$ can be aliphatic, cycloaliphatic araliphatic, aromatic or heterocyclic radicals which can, if desired, be further substituted. Thus, for example, it can be aliphatic such as substituted or unsubstituted alkyl, alkenyl or alkynyl, representative examples of which are alkyl such as methyl, propyl, isopropyl, t-butyl, hexyl, octyl, decyl, dodecyl, haloalkyl such as chloroethyl, fluoropropyl, bromomethyl and dichloroethyl, acylamidoalkyl such as acetylaminomethyl and benzoylaminoethyl, acyloxyalkyl such as acetoxymethyl, propionoxyethyl and benzoyloxyethyl, other substituted alkyl groups such as hydroxypropyl, piperidinomethyl, aminomethyl and aminoethyl, alkylaminoalkyl such as dimethylaminomethyl, diethylaminopropyl, carboalkoxymethyl, cyanoethyl, sulfonamidoethyl, phthalimidomethyl and methoxymethyl; alkenyl such as allyl, methallyl, vinylpropenyl, hexenyl, octadienyl, alkynyl such as propargyl, ethynyl on chlorethynyl; cycloalkyl such as cyclohexyl, cyclohexenyl or cyclopropyl. When R$_1$ and R$_2$ are aliphatic, they preferably have from one to six carbon atoms.

Examples of R$_1$ and R$_2$ representing an araliphatic radical are those cases where it is aralkyl such as benzyl, phenethyl, phenylpropyl, p-halobenzyl and o-, m- or p-alkoxybenzyl, nitrobenzyl, aminophenethyl, pyridylethyl, furylmethyl, thienylpropyl and the like.

R$_1$ and R$_2$ may also represent an aryl radical such as phenyl, naphthyl or substituted phenyl, e.g., p-chlorophenyl, o-nitrophenyl, o,p-dihalophenyl, cyanophenyl, methoxyphenyl, aminophenyl and tolyl, and preferably a mononuclear aromatic residue. When R$_1$ or R$_2$ is heterocyclic, it can be heteroaromatic such as pyridyl, furyl, thienyl, thiazolyl or pyrazinyl, or alternatively it can represent a hydrogenated hetero ring, examples of which are tetrahydrofuryl and piperazinyl.

When R$_1$ and/or R$_2$ are acyl, they are preferably lower alkanoyl or aroyl such as acetyl, propionyl, butyryl, hexanoyl, benzoyl, halobenzoyl, nitrobenzoyl and the like.

In accordance with the present invention, it is found that various micro-organisms producing enzymes capable of selectively hydrolyzing esters and amides of (−) (cis-1,2-epoxypropyl)phosphonic acid are available. Thus, bacteria such as those of order Actinomycetes, for example *Nocardia corallina;* fungi such as suitable Penicillium strains, for example *Penicillium frequentans* and *Penicillium vermiculatum;* Aspergillus strains, for example *Aspergillus niger* Fungi imperfecti, for example *Ashbya gossypii* and *Helicostylum piriforme* have all been found to produce enzymes capable of selectively hydroylzing esters and amides of (−) (cis-1,2-epoxypropyl)phosphonic acid.

The micro-organism producing useful enzymes for carrying out the processes of this invention can readily be found either by cultivating known micro-organisms or unknown micro-organisms obtained from sources such as soils and the like in the presence of a monoester or amide of (−) (cis-1,2-epoxypropyl)phosphonic acid and determining after good growth of the organism is achieved (2–5 days usually being sufficient for this purpose) whether or not the supernatant liquor has activity as determined by the *Proteus vulgaris* assay. Alternatively, this same screening can be effected using resting cells containing the enzyme and incubating such cells in suitable media such as, for example, Tris 0.05M buffer at pH 8.0 for 2–4 days and then assaying the liquid portion with *Proteus vulgaris*. In carrying out such tests it is desirable to simultaneously inoculate the test micro-organism in a suitable nutrient medium without the monoester or amide in order to distinguish those organisms which produce the antibiotic directly from those capable of selectively hydrolyzing the esters or amides.

The following examples illustrate methods of carrying out this invention.

EXAMPLE 1

A medium containing 0.8 percent nutrient broth (Difco), 0.2 percent yeast extract, 3 percent cerelose and 0.3 percent malt extract in distilled water is adjusted to pH 7.0. 40 ml. of this medium is placed in a 250 ml. Erlenmeyer flask which is then autoclaved at 15 p.s.i. for 15 minutes. The medium is then inoculated with a loopful of inoculum from an agar slant of *Aspergillus niger* NRRL–67 and incubated on a mechanical shaker operating at 220 r.p.m. with a 2-inch throw at 28° C. for 4 days until good growth of the organism is obtained. Ten ml. of the resulting fermentation broth is aseptically transferred to a centrifuge tube and the cells are pelleted in a centrifuge at 25,000×G. The supernatant fluids are discarded and the pelleted cells are resuspended in 4 ml. of 0.05 M (hydroxymethyl)-aminomethone buffer (Tris buffer) adjusted to pH 8.0. Two ml. of the resulting cell suspension is then aseptically transferred to a sterile 20×200 mm. test tube containing 200γ of sodium monomethyl racemic (cis-1,2-epoxypropyl)phosphonate in 2 ml. of 0.005 (hydroxymethyl)-aminomethane pH 8.0 buffer. The tube is incubated for 48 hours at 28° C., on a mechanical shaker. The resulting incubated broth is centrifuged at 25,000×G and the supernatant fluid is examined for biological activity by disc assay with *Proteus vulgaris* MR–838 (ATCC 21100 and NRRL B–3361) and found to have an inhibition zone of 26 mm. indicating the presence of a salt of (−) (cis-1,2-epoxypropyl)phosphonic acid.

Control tubes containing (1) 2 ml. of cell suspension plus 2 ml. of 0.05 M (hydroxymethyl)-aminomethane pH 8.0 buffer and (2) 4 ml. of the same buffer containing 200γ of sodium monomethyl racemic (cis-1,2-epoxypropyl)phosphonate are similarly incubated for 48 hr. at 28° C. The supernatant liquid from each of these control tubes is found to give no inhibition in the *Proteus vulgaris* assay.

The assay using *Proteus vulgaris* MB–838 is carried out as follows.

The test culture is maintained as a slant culture on nutrient agar (Difco) plus 0.2 percent yeast extract (Difco). The inoculated slants are incubated at 37° C. for 18–24 hours and stored at refrigerator temperatures for 1 week, fresh slants being prepared each week.

The inoculum for the assay plates is prepared each day by inoculating a 250 ml. Erlenmeyer flask containing 50 ml. of nutrient broth (Difco) plus 0.2 percent yeast extract (Difco) with a scraping from the slant. The flask is incubated at 37° C. on a shaking machine for 18–24 hours. The broth culture is then adjusted to 40 percent transmittance at a wavelength of 660 mμ using a Bausch & Lomb Spectronic 20 by the addition of 0.2 percent yeast extract solution to the growth. Uninoculated broth is used as a blank for this determination. 30 ml. of the adjusted broth is used to inoculate 1 liter of medium.

Nutrient agar (Difco) plus 0.2 percent yeast extract (Difco) is used as the assay medium. This medium is prepared, sterilized, by autoclaving, and allowed to cool to 50° C. After the medium is inoculated, 10 ml. is added to sterile petri dishes and the medium is allowed to solidify.

Samples of the supernatant liquid to be assayed are diluted in 0.05 M Tris buffer at pH 8.0 to an appropriate concentration. Discs are dipped into the test solution and placed on the surface of the assay plate; two discs for each sample are normally placed on one plate opposite to one another. Two discs dipped into 0.4 units per ml. (−) (cis-1,2-epoxypropyl)phosphonic acid solution are placed on the plate in an alternate position to the sample. The plates are incubated at 37° C. for 18 hours and the zone diameters in millimeters are determined. The potency of the sample is determined by means of a nomograph or from the standard curve. One mg. of pure (−) (cis-1,2-epoxypropyl)phosphonic acid contains 357 units, a unit being as the concentration of the product which will produce a zone diameter of 28 mm.

EXAMPLE 2

When the procedure of example 1 is repeated using *Ashbya gossypii* NRRL Y 1056 in place of *Aspergillus niger* the supernatant liquid is found to have an inhibition zone of 18 mm. in the *Proteus vulgaris* assay.

EXAMPLE 3

When the procedure of example 1 is repeated using 200γ of sodium monoethyl racemic (cis-1,2-epoxypropyl)phosphonate, the resulting supernatant liquid is found to give a 30 mm. zone of inhibition upon assay with *Proteus vulgaris*.

EXAMPLE 4

Following the procedure of example 1 using the same quantity of the sodium salt of the monopropyl racemic ester in place of the monomethyl ester, the resulting supernatant liquid is found to give an inhibition zone of 20 mm. in the *Proteus vulgaris* assay.

EXAMPLE 5

Following the procedure of example 1 but substituting the same quantity of the sodium salt of the monoallyl racemic ester in place of the monomethyl ester, the resulting supernatant liquid is found to give a 30 mm. zone of inhibition upon assay with *Proteus vulgaris*.

EXAMPLE 6

Following the procedure described in example 1, resting cells of *Ashbya gossypii* NRRL Y 1056 are obtained in pellet form. When these cells are incubated in Tris buffer at pH 8 with 2 ml. of a 200γ per ml. solution of sodium monoethyl racemic (cis-1,2-epoxypropyl)phosphonate using the procedures described in example 1, the supernatant liquor obtained after incubation for 48 hours is found to give an inhibition zone of 17 mm. by the *Proteus vulgaris* assay.

EXAMPLE 7

Following the procedures described in example 6 but substituting the sodium salt of the monoallyl racemic ester in place of the monoethyl ester, it is found that the resulting incubated broth has an inhibition zone of 24 mm. as determined by the *Proteus vulgaris* assay.

EXAMPLE 8

Following the procedures described in example 1, resting cells of *Nocardia corallina* ATCC 4273 are obtained in pellet form. When these resting cells are incubated with the sodium salt of the monomethyl ester of racemic (cis-1,2-epoxypropyl)phosphonic acid, following the procedures described in example 1, the resulting incubated broth is found to have an inhibition zone of 12 mm. as determined by the *Proteus vulgaris* assay.

EXAMPLE 9

When the procedure of example 8 is repeated using the same quantity of the sodium monoethyl ester salt in place of the monomethyl ester salt, the resulting incubated broth is found to have an inhibition zone of 13 mm. as determined by the *Proteus vulgaris*.

EXAMPLE

When the procedures of example 8 are repeated using the same quantity of the sodium monopropyl racemic ester salt in place of the monomethyl racemic ester salt, the resulting incubated broth is found to have an inhibition zone of 11 mm. as determined by the *Proteus vulgaris* assay.

EXAMPLE 11

When the procedures of example 8 are repeated using the same quantity of the sodium monoallyl racemic ester salt in place of the monomethyl racemic ester salt, the resulting incubated broth is found to have inhibition zone of 19 mm. as determined by the *Proteus vulgaris* assay.

EXAMPLE 12

Following the procedures described in example 1, *Pencillium frequentans* NRRL 1915 is cultured and the resulting cells isolated as a pellet. The resting cells are then incubated with the sodium salt of monomethyl racemic (cis-1,2-epoxypropyl)phosphonic acid and the resulting liquid solution assayed by means of the *Proteus vulgaris* procedures. The assay shows that the product has an inhibition zone of 21 mm.

EXAMPLE 13

To 40 ml. of a sterile medium consisting of 0.8 percent nutrient broth, 0.2 percent yeast extract, 3 percent cerelose and 0.3 percent malt extract in distilled water adjusted to pH 7.0 in a 250 ml. Erlenmeyer flask is added inoculum of *Aspergillis niger* NRRL 67 from an agar slant. The inoculated flask 50°incubated C., mechanical shaker running at 220 r.p.m. with a 2-inch throw at 28° C. for 4 days. Ten ml. of the resulting fermentation broth is then aseptically transferred to a centrifuge, and the cells are pelleted at 25,000×G. The supernatant liquid is discarded, and the pelleted cells are resuspended in 4 ml. of 0.05 Tris buffer at pH 8.0. Two ml. of the resulting cell suspension is then aseptically transferred to a sterile 20×200 mm. test tube containing 200γ of N,N'-tetraethyl racemic (cis-1,2-expoxypropyl)phosphonamide in 2 ml. of 0.05 M Tris buffer at pH 8.0. The tube is then incubated for 48 hours at 28° C. in a mechanical shaker running at 220 r.p.m. with a 2-inch throw. After incubation the cells are removed by centrifugation and the supernatant liquid assayed for biological activity with *Proteus vulgaris* MB–838. The assay showed the solution to have an inhibition zone of 38 mm.

EXAMPLE 14

Following the procedures described in example 13, *Helicostylum piriforme* ATCC 8992 is grown and the resulting cells are incubated with N,N'-tetramethyl racemic (cis-1,2-epoxypropyl)phosphonamide for 2 days at 28° C. The supernatant liquid of the resulting incubated broth is found to give an inhibition zone of 35 mm. when assayed with *Proteus vulgaris* MB–838.

EXAMPLE 15

Following the procedures described in example 13, cells of *Pencillium frequentans* NRRL 1915 are incubated with N,N'-tetramethyl racemic (cis-1,2-epoxypropyl)phosphonamide and the resulting incubated fluid portion is found to have an inhibition zone of 39 mm. when assayed with *Proteus vulgaris*.

EXAMPLE 16

When resting cells of *Aspergillus fumigatus* NRRL 165 are used in place of *Aspergillus niger* in example 13, the supernatant fluid is found to give a 44 mm. zone of inhibition when assayed with *Proteus vulgaris* MB 838.

EXAMPLE 17

Using the procedures described in example 13, resting cells of *Pencillium vermiculatum*, culture 54 B in Quatermaster collection at Natick, Conn., are incubated with N,N'-tetramethyl racemic (cis-1,2-epoxypropyl)phosphonamide for 48 hours and the resulting supernatant liquid is found to have an inhibition zone of 32 mm. when assayed with *Proteus vulgaris* MB 838.

EXAMPLE 18

A solution of 1.2 g. $KH_2PO_4$, 2.4 g. $Na_2HPO_4$, 0.4 g. $NH_4Cl$, 0.002 g. $ZnSO_4 \cdot 5H_2O$, 0.004 g. $FeSO_4$, 2 g. $CaCO_3$ and 2 g. of ethyl lactate in 400 ml. of tap water in a 4-liter Erlenmeyer flask is adjusted to pH 7.0 and the flask sterilized by autoclaving at 121° C. and 15 p.s.i. for 15 minutes. To the resulting sterile medium is added a vegetative growth of *Aspergillus niger* NRRL 67 and the resulting inoculated flask is incubated for 4 days on a rotary shaking machine operating at 220 r.p.m. with a 2-inch throw at 28° C. To this fermenting medium is then added 40 ml. of an aqueous solution containing 20 g. of sodium monoethyl racemic (cis-1,2-epoxypropyl)phosphonate, previously neutralized to pH 7 and sterilized by filtration. The incubation is then continued for another 24 hours.

The resulting fermentation medium is then filtered and the filtrate is repeatedly evaporated with methanol in vacuum until a solution consisting of 90 percent methanol is obtained. This methanol solution is then filtered to remove precipitated inorganic salts and the residue washed with methanol which is added to the filtrate. The resulting methanol solution is chromatographed on a column containing 2,000 g. of alumina; the concentrated solution being added to the alumina previously washed with methanol. The column is then developed with methanol and 200 ml. fractions of eluate are taken. The fractions are assayed by means of the *Proteus vulgaris* assay procedure, and the fractions containing antibiotic activity are combined and the methanol removed by evaporation under diminished pressure. The residue containing the sesqui sodium salt of (−) (cis-1,2-epoxypropyl)phosphonic from aqueous methanol to obtain the sesqui sodium salt in pure crystalline form. A 2 percent solution of this product in water has a pH of 6.8 and an $$[\alpha]^{28° C.}_{405\,mu} - 14.9°.$$

The enantiomeric esters and amides of (cis-1,2-epoxypropyl)phosphonic acid used in the process of this invention are obtained by epoxidizing the corresponding derivatives of cis-propenylphosphonic acid.

Thus, the monoesters are prepared by epoxidizing the corresponding monoesters of cis-monopropenylphosphonic acid or, alternatively, by acid hydrolysis of the diester of (cis-1,2-epoxypropyl)phosphonic acid. For example, the monoesters can be prepared starting with di-t-butyl-phosphorochloridite as follows:

Phosphorus trichloride (68.7 grams, 0.5 mole) and 750 ml. of anhydrous benzene are placed in a 2-liter, 3-necked flask equipped with mechanical stirrer, thermometer, dropping funnel and a drying tube. The solution is cooled to 5° C. and triethylamine (50.6 grams, 0.5 mole) is added at 5°–10° C. during 20 minutes. The benzene solution is then stirred for 20 minutes. A solution of triethylamine (50.6 grams, 0.5 mole) and t-butanol (37.06 grams, 0.5 mole) is added with stirring during 20 minutes at 5°–10° C., and the mixture is stirred for 20 minutes. A second portion of t-butanol (37.06 grams, 0.5 mole) is then added at 5°–10° C. over a 20 minute period and the reaction mixture containing di-t-butyl phosphorochloridite is stirred for 90 minutes at 5°–10° C.

Triethylamine (50.6 grams, 0.5 mole) and propargyl alcohol (28.03 grams, 0.5 mole) are dissolved in 40 ml. of anhydrous benzene, and the solution is added to the reaction mixture containing di-t-butylphosphorochloridite with stirring during 25 minutes, maintaining the reaction temperature between 5° and 10° C. by external cooling. The resulting mixture containing di-t-tubyl-2-propynylphosphite is stirred at 5°–10° C. for 1 hour.

The reaction mixture containing di-t-butyl-2-propynylphosphite is then heated to reflux, and the refluxing is continued for 1 hour. The solution is then cooled to room temperature with a water bath, and 185 ml. of water is added in portions. The triethylamine hydrochloride dissolved in the aqueous layer, and the organic layer is separated from the aqueous layer. The benzene solution is heated at atmospheric pressure, and the water is removed by azeotropic distillation. The residual benzene solution contains di-t-butylpropadienylphosphonate.

Where desired, the pure ester can be obtained by removing the solvent and distilling the ester under high vacuum; the pure ester is characterized by IR and NMR spectra.

The dried benzene solution of di-t-butyl-propadienylphosphonate is hydrogenated at 20°–25° C. with 5 percent palladium-on-carbon catalyst (5.0 grams) until hydrogen absorption ceases. The catalyst is removed by filtration and is washed with 2×50 ml. of benzene. Upon removal of the solvent in vacuo, di-t-butyl-cis-propenylphosphonate is obtained and is characterized by NMR and IR spectra. The crude ester can be purified by high-vacuum distillation.

Di-t-butyl-cis-propyenylphosphante (1.0 mole) and para-toluene sulfonic acid (0.005 mole) are dissolved in 235 ml. of benzene, and the solution is heated at reflux until the calculated amount of isobutene is formed. A gas metering device is employed to detect the isobutene. The reaction mixture is then cooled to room temperature, the solvent is removed in vacuao and cis-propenylphophonic acid is obtained as the residue.

The diesters of cis-propenylphosphonic acid are obtained by first converting the free acid to cis-propenylphosphonic dichloride, and then reacting this dichloride with 2 molar equivalents of an alcohol represented by the formula R—OH, where R represents the alcohol residue of the resulting ester. The monoesters are prepared from the diesters by removal of one of the ester radicals with base. A monosalt monoester may then be prepared by reacting the monoester with one equivalent of base. Representative examples for the foregoing reactions are given herein, and it is to be understood that other esters and salts are obtained in the same manner from the appropriate starting materials.

a. Into a 250 ml. three-necked round-bottomed flask there is added 6.1 g. of cis-propenylphosphonic acid, 60 ml. of dry benzene and 9.0 ml. of pyridine. The mixture is heated to 50° C., the heat removed and 13.2 g. of thionyl chloride added dropwise at such a rate as to keep the reaction mixture at 50° C. The mixture is then cooled to room temperature and stirred for 2 hours at room temperature. The mixture is filtered and the filtrate concentrated in vacuum at 35° C. to yield 4.5 g. of a turbid oil. It is distilled to afford cis-propenylphosphonic dichloride, b.p. 67–69° C./9–10 mm.; $n_D^{20}$: 1.4885.

b. A stirred mixture of 0.1 mole of cis-propenylphosphonic dichloride and 0.2 mole of triethylamine in 100 ml. of benzene is cooled to 5° C. To the mixture there is added 0.2 mole of methyl alcohol at such a rate as to maintain the temperature at 5°—10 C. When the addition is complete, the mixture is stirred at room temperature for 1 hour. The precipitated triethylamine hydrochloride salt is then filtered off and the solvent is removed at reduced pressure to leave dimethyl cis-propenylphosphonate. Other diesters of cis-propenylphosphonic acid such as the alkyl, alkenyl, alkynyl, substituted alkyl, alkenyl or alkynyl esters are prepared in the same manner using 0.2 mole of the appropriate alcohol.

The dimethyl cis-propenylphosphonate is then converted to the sodium salt of the monomethyl cis-p-propenylphosphonate heating the diester in aqueous sodium hydroxide for sufficient time to convert the diester to the monoester. Similarly, other dialkyl, dialkenyl, or dialkynyl esters are converted to the salt of the monoester in the manner.

c. To a 50 ml. round-bottom 3-necked flask fitted with a stirrer, thermometer and addition funnel is added 1.5 g. (0.01 mole) of sodium monomethyl cis-propenylphosphonate in 30 ml. of methanol. The pH is adjusted to 4.5 with 2.5 N sodium hydroxide. Sodium tungstate dihydrate (0.06 g.) is added and the mixture heated to 55° C. Hydrogen peroxide 30 percent (3 ml.) is added dropwise over 15 minutes at 55°–60° C. Hydrogen peroxide is added as needed to maintain a positive starch-iodide test. The mixture is quenched by adding saturated sodium sulfite solution to a negative starch-iodide test. The inorganic solids are removed by filtration, the solution evaporated to one-half volume and chilled. The solid sodium methyl (±) (cis-1,2-epoxypropyl)phosphonate thus obtained is separated by filtration, washed with ethanol and dried. The same result is obtained with zinc vandate or sodium selenomolybdotungstate is used as cataylst in place of sodium tungstate.

When an equimolar amount of sodium n-butyl cis-propenylphosphonate, sodium ethyl cis-propenylphosphonate, sodium monovinyl cis-propenylophosphonate, potassium monoallyl cis-propenylphosphonate or potassium propargyl cis-propenylphosphonate is expoxidized as described above, the sodium salt of the n-butyl, ethyl, vinyl, allyl, and propargyl ester of racemic (cis-1,2-epoxypropyl)phosphonate is obtained.

The phosphono amides and diamides employed as starting materials are obtained by reacting the cis-propenylphosphonic dichloride with a primary or secondary amine. When one mole of amine is used, one of the chlorides is displaced to afford a cis-propenylphosphonochloridic amide.

The diamides are obtained from the cis-propenylphosphonic dichloride according to the above procedures by utilizing 2 moles of primary or secondary amine. The monoamides or diamedes of cis-propenylphosphonic acid so obtained can then be reacted with hydrogen peroxide to produce the corresponding amides of (cis-1,2-epoxypropyl)phosphonic acid. For example, racemic N,N'dibenzoyl (cis-1,2-epoxypropyl)phosphondiamide is prepared as follows.

To a mixture of 3.25 g. of N,N'-dibenzoyl-cis-propenylphosphonodiamide in 15 ml. of methanol there is added 0.06 g. of sodium tungstate dihydrate and the mixture heated to 55° C. Three ml. of 30 percent hydrogen peroxide is then added slowly over 15 minutes, and the resulting mixture stirred for 1 hour at 55° C. The hydrogen peroxide is added during this time as necessary to maintain a positive starch-iodide test. At the end of the 1 hour, saturated aqueous sodium sulfite is added to decompose any remaining peroxide, the mixture filtered and evaporated to dryness under reduced pressure to afford N,N'-dibenzoyl (±) (cis-1,2-epoxypropyl)phosphondiamide. Inorganic salts are separated by extracting the phosphondiamide into methanol. When N,N-diethyl-cis-propenylphosphonoamide and N,N'-tetramethyl-cis-propenylphosphondiamide is expoxidized using the same procedures, racemic N,N-dimethyl (cis-1,2-epoxypropyl)phosphonamide and racemic N,N,N'N'-tetramethyl-(cis-1,2-epoxypropyl)phosphondiamide is epoxidized using the same procedures, racemic N,N-dimethyl (cis-1,2-epoxypropyl)phosphonamide and racemic N,N,N'N'-tetramethyl-(cis-1,2-epoxypropyl)phosphondiamide are obtained respectively (−) (Cis-1,2-epoxypropyl)phosphonic acid and its salts are useful antimicrobial agents, which are active in inhibiting the growth of both gram-positive and gram-negative pathogenic bacteria. This antibiotic, and particularly its salts, are active against *Bacillus, Escherichia, Staphylococci, Salmonella* and *Proteus* pathogens, and antibiotic-resistant strains thereof. Illustrative of such Pathogens are *Bacillus subtilis, Escherichia* coli, *Salmonella schottmuelleri*, *Salmonella gallinarum*, *Salmonella pullorum*, *Proteus vulgaris*, *Proteus mirabilis*, *Proteus morganii*, *Staphylococcus aureus* and *Staphyloccus pyrogenes*. Thus, (−) (cis-1,2-epoxypropyl)phosphonic acid and salts thereof can be used as antiseptic agents to remove susceptible organisms from pharmaceutical, dental and medical equipment and other areas subject to infection by such organisms. Similarly, they can be used to separate certain micro-organisms from mixtures of micro-organisms. Salts of (−) (cis-1,2-epoxypropyl)phosphonic acid are also useful in the treatment of diseases caused by bacterial infections in man and animals and are particularly valuable in this respect, since they are active against resistant strains of pathogens. These salts are especially valuable, since they are effective when given orally, although they can also be administered parenterally.

Since the antibiotic and its salts are very active in inhibiting the growth of various species of *Salmonella*, it can be used as a disinfectant in washing eggs and areas subject to infection by *Salmonella*. The salts of (−) (cis-1,2-epoxypropyl)phosphonic acid are also useful as bactericides in various industrial applications, for example, in inhibiting undesirable bacterial growth in the white water in paper mills and in paints such as polyvinyl acetate latex paint.

When (−) (cis-1,2-epoxypropyl)phosphonic acid or its salts are used for combatting bacteria in man or lower animals, they may be administered orally in a dosage unit form such as capsules or tablets, or a liquid solution or suspension. Alternatively, the antibiotic can be administered parenterally by injection. These formulations can be prepared using suitable diluents, extenders, granulating agents, preservatives, binders, flavoring agents, and coating agents known to those skilled in this art.

(−) (cis-1,2-epoxypropyl)phosphonic acid can be represented by the formula:

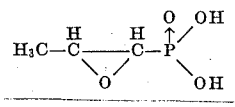

This substance is an acidic compound which is named as (−) (cis-1,2-epoxypropyl)phosphonic acid in accordance with present chemical nomenclature practice; the (−) indicating that this phosphonic acid rotates plane-polarized light in a counterclockwise direction (to the left as viewed by the observer) when the rotation of its disodium salt is measured in water (5 percent concentration) at 405 mμ. The designation cis used in describing the 1,2-epoxypropylphosphonic acid compound means that the hydrogen atoms attached to carbon atoms 1 and 2 of the propylphosphonic acid are the same side of the oxide ring.

The structural formula of this antibiotic substance has been shown in the planar formula for the sake of convenience. However, the antibiotic can also be depicted spatially as follows:

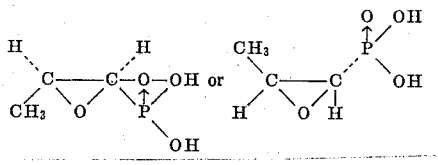

The dextrorotatory enantiomer of (cis-1,2-epoxypropyl)phosphonic acid can be converted to cis-propenylphosphonic acid by heating with potassium thiocyanate in aqueous methanol. The cis-propenylphosphonic acid thus obtained can be used as a starting material in the processes described herein to produce the levorotatory enantiomer of (cis-1,2-epoxypropyl)phosphonic acid.

What is claimed is:
1. The process for preparing (−) (cis-1,2-epoxypropyl)phosphonic acid which comprises subjecting an enantiomeric mixture of esters and amides of (cis-1,2-epoxypropyl)phosphonic acid to the action of the enzymes produced by growing a micro-organism capable of selectively hydrolyzing an ester or amide of the (−) isomer.

2. The process of claim 1 wherein the ester is a monoester of the formula

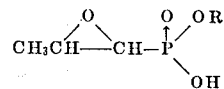

or salts thereof wherein R is a lower alkyl group of one to seven carbon atoms, a lower alkenyl group of two to seven carbon atoms, or a lower alkynyl group of two to seven carbon atoms.

3. The process of claim 1 wherein the amide is of the formula

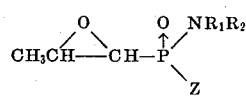

wherein Z is —NR₁R₂ or OH R₁ and R₂ represent a hydrocarbyl group, a substituted hydrocarbyl group or hydrogen and can be the same or different.

4. The process of claim 1 wherein the micro-organism is a member Aspergillus. *Fungi imperfecti* group of micro-organisms.

5. The process of claim 1 wherein the micro-organism is a *Penicillium*.

6. The process of claim 1 wherein the micro-organism is an *aspergillus*.

7. The process of claim 1 wherein the micro-organism is an *Actinomycetes*.

8. The process for preparing (−) (cis-1,2-epoxypropyl)phosphonic acid which comprises subjecting an enantiomeric mixture of esters or amides of (cis-1,2-epoxypropyl)phosphonic acid to the action of the enzymes produced by growing a micro-organism capable of selectively hydrolyzing an ester or amide of the (−) isomer, to (−) (cis-1,2-epoxypropyl)phosphonic acid, and separating and recovering said acid in the form of a salt thereof.

9. The process of claim 8 wherein the micro-organism is *Fungi imperfecti*.

10. The process of claim 8 wherein the micro-organism is a *Penicillium*.

11. The process of claim 8 wherein the micro-organism is an *Aspergillus*.

12. The process of claim 8 wherein the micro-organism is an *Actinomycetes*.

* * * * *

UNITED STATES PATENT OFFICE
CERTIFICATE OF CORRECTION

Patent No. 3,635,795     Dated January 18, 1972

Inventor(s) Arnold L. Demain, et al

It is certified that error appears in the above-identified patent and that said Letters Patent are hereby corrected as shown below:

Column 10, line 12, "and" should be -- or -- ; line 40, "Aspergillus" should be -- of the -- ; line 45, "aspergillus" should read -- Aspergillus -- ; line 56, after "is", insert -- a -- .

Signed and sealed this 17th day of October 1972.

(SEAL)
Attest:

EDWARD M. FLETCHER, JR.           ROBERT GOTTSCHALK
Attesting Officer                 Commissioner of Patents